United States Patent
Braghin et al.

(10) Patent No.: US 11,176,257 B2
(45) Date of Patent: Nov. 16, 2021

(54) REDUCING RISK OF SMART CONTRACTS IN A BLOCKCHAIN

(71) Applicant: INTERNATIONAL BUSINESS MACHINES CORPORATION, Armonk, NY (US)

(72) Inventors: Stefano Braghin, Dublin (IE); Emanuele Ragnoli, Mulhuddart (IE); Killian Levacher, Dublin (IE)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 302 days.

(21) Appl. No.: 16/539,914

(22) Filed: Aug. 13, 2019

(65) Prior Publication Data

US 2021/0049281 A1 Feb. 18, 2021

(51) Int. Cl.
*G06F 21/00* (2013.01)
*G06F 21/57* (2013.01)
*G06F 21/52* (2013.01)
*H04L 9/06* (2006.01)

(52) U.S. Cl.
CPC ............ *G06F 21/577* (2013.01); *G06F 21/52* (2013.01); *H04L 9/0637* (2013.01); *H04L 9/0643* (2013.01); *H04L 2209/38* (2013.01)

(58) Field of Classification Search
None
See application file for complete search history.

(56) References Cited

U.S. PATENT DOCUMENTS

| | | | |
|---|---|---|---|
| 9,807,106 B2 | 10/2017 | Daniel et al. | |
| 2016/0217436 A1* | 7/2016 | Brama | G06Q 20/10 |
| 2017/0034197 A1* | 2/2017 | Daniel | H04L 9/3236 |
| 2017/0149819 A1* | 5/2017 | Androulaki | H04L 9/3236 |
| 2018/0218343 A1 | 8/2018 | Kolb et al. | |
| 2020/0067697 A1* | 2/2020 | Puddu | G06F 21/602 |

FOREIGN PATENT DOCUMENTS

WO 2017145005 A1 8/2017

OTHER PUBLICATIONS

"Madmax: Surviving Out-of-Gas Conditions in Ethereum Smart Contracts". Neville Grech, et al. Proc. ACM Program. Lang., vol. 2, No. OOPSLA, Article 116. Publication date: Nov. 2018. (27 Pages).

"Attack and Defense of Ethereum Remote APIs". Conference paper Dec. 2018. Xu Wang et al. See discussions, stats, and author profiles for this publication at: https://www.researchgate.net/publication/330351717 ( 7 Pages).

"Obsidian: A Safer Blockchain Programming Language". Michael Coblenz, 2017 IEEE/ACM 39th IEEE International Conference on Software Engineering Companion ( 3 Pages).

* cited by examiner

*Primary Examiner* — Andrew J Steinle
(74) *Attorney, Agent, or Firm* — Griffiths & Seaton PLLC

(57) ABSTRACT

A system and method for reducing risk of smart contracts in blockchains in a computer environment are presented. One or more smart contracts may be accepted or rejected from a secondary blockchain to a primary blockchain according to a risk assessment to recursive call attack vulnerabilities.

17 Claims, 8 Drawing Sheets

REDUCING RISK OF SMART CONTRACTS IN A BLOCKCHAIN

BACKGROUND OF THE INVENTION

Field of the Invention

The present invention relates in general to computing systems, and more particularly to, various embodiments for reducing risk of smart contracts in a blockchain by a processor.

Description of the Related Art

In today's society, consumers, business persons, educators, and others use various computing network systems with increasing frequency in a variety of settings. Computer systems may be found in the workplace, at home, or at school. Computer systems may include data storage systems, or disk storage systems, to process and store data. In recent years, both software and hardware technologies have experienced amazing advancement. With the new technology, more and more functions are added and greater convenience is provided for use with these computing systems.

SUMMARY OF THE INVENTION

Various embodiments for reducing risk of smart contracts in blockchains using one or more processors are provided. In one embodiment, by way of example only, a method for reducing risk of smart contracts in blockchains, again by a processor, is provided. One or more smart contracts may be submitted to a secondary blockchain by one or more of a plurality of nodes prior to accepting the one or more smart contracts to a primary blockchain. The one or more smart contracts may be accepted or rejected from the secondary blockchain to the primary blockchain according to a risk assessment to recursive call attack vulnerabilities.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
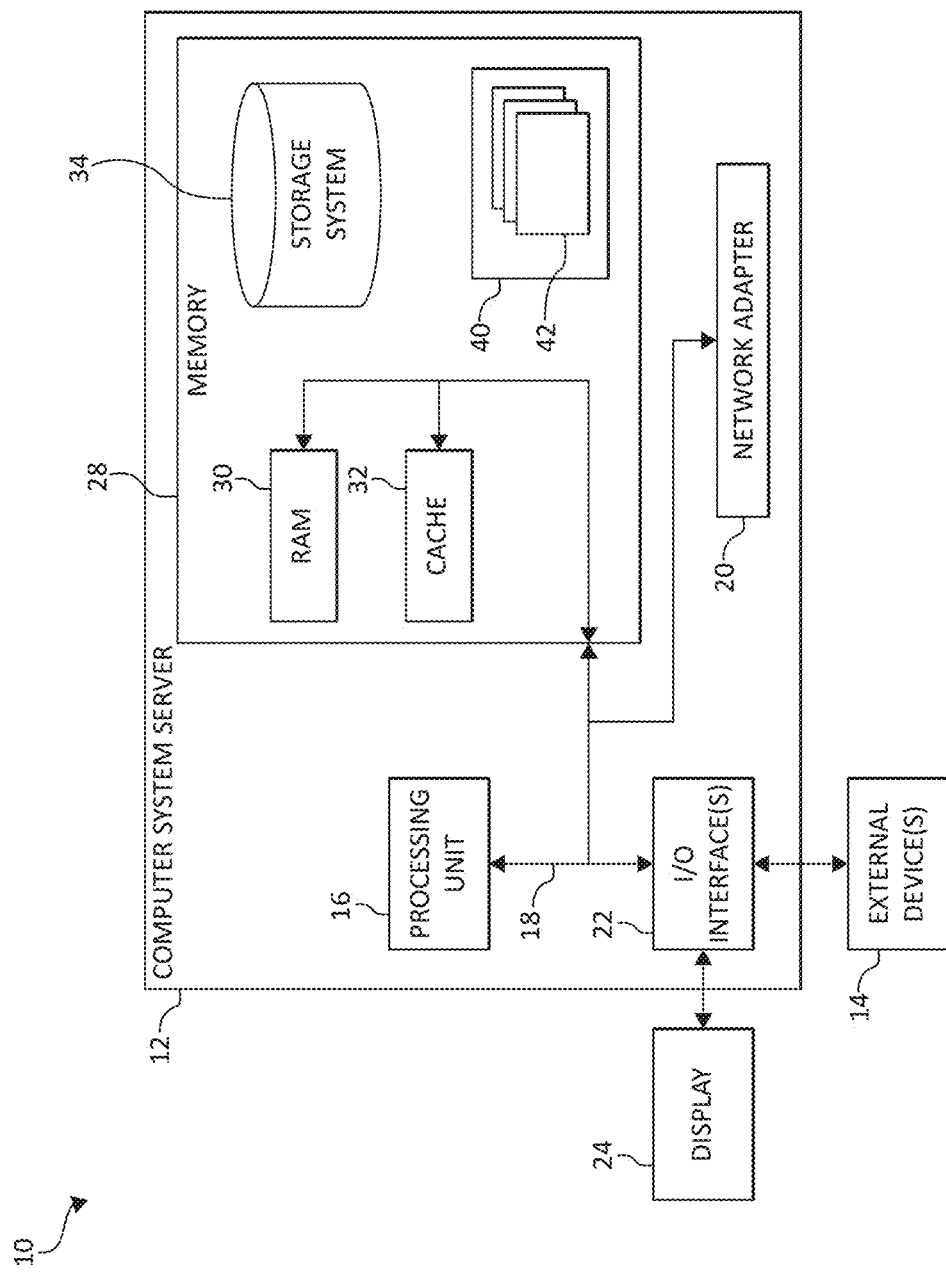
FIG. 1 is a block diagram depicting an exemplary computing node according to an embodiment of the present invention.

A blockchain is a distributed database that may be used to maintain a transaction ledger. A transaction ledger may denote an ordered set of transactions that have been validated or confirmed within a system up to a certain point in time. A transaction ledger may include a continuously-growing list of data records, where each data record may include data relating to one transaction. Further, encryption and other security measures may be used to secure the transaction ledger from tampering and revision. The blockchain may include a number of blocks, each block holding one or more individual transactions or data records. Further, each block may contain a timestamp and a link to a previous block. A blockchain network may be used and enabled users may be allowed to connect to the network, send new transactions to the blockchain, verify transactions, and/or create new blocks.

Additionally, the blockchain database maintains a continuously growing list of data records and is formed from blocks of data records that are connected together through the use of hashing. For example, every time a new block is added to the blockchain, the new block includes a hash of a prior block. In this manner, each additional block creates additional security for the validity of the entire blockchain. Each block records and confirms the sequence and timing of transactions, e.g., smart contracts, as they are created and/or executed. That is, smart contract provides for the storage of data within blockchain transactions and may also be automatically executed when predetermined terms and conditions are met.

A subset of blockchain platforms are Turing-complete systems that allow the storage of assets that can be managed with the use of application agents (e.g., "software agents") that are encoded on the blockchain. In one aspect, "assets" or "Blockchain assets" are a type of digital asset or cryptocurrency, and sometimes represent stakes in a particular project or company. This means that asset as used herein may represent any digital entity that can be immediately transferred such as, for example, cryptocurrency or other digital value. The amount and value of the asset of the blockchain itself is modified with a call and execution of the application agents. Hence, for example, an asset containing crypto-currencies, is enabled to know the crypto-currency value to know an increase or decrease of the crypto-currency value with the combined actions of multiple and heterogeneous software agents. If an application agent contains recursive functions with depleting or inflating skills/assets, the application agent can be exploited to generate a recursive call attack, that, if unchecked, causes the leak of the asset.

For example, consider the following example of recursive attaches and recursive calling vulnerability. In step 1, an attacker creates a wallet contract with a default (or fallback) function( ) to call a data access object's ("DAO") split DAO( ) function a number of times such as, for example, as illustrated in the following default function ( ) pseudo code:

```
function ( ) {
  // Note that the following statement can only be called recursively
  // a limited number of times to prevent running out of gas or
  // exceeding the call stack
  call TheDAO.splitDAO( . . . )
}
```

In step 2, the attacker creates (or joins) a split proposal with the recipient address and begins set to the wallet contract created in the step 1. In step 3, the attacker votes "Yes" on the split proposal. In step 4, after the split proposal expires, the attacker calls the DAO's splitDAO( . . . ) function. In step 4a), the splitDAO( . . . ) function calls the wallet contract's default function ( ) as part of sending the ethers to the recipient. In step 4b), the wallet contract's default function ( ) calls the DAO's splitDAO( . . . ) again, which repeats the cycle from step 4a. In step 4c, the wallet contract's default function ( ) must ensure that an error is not thrown as the transactions will be rolled back if the call stack or gas is exceeded.

Accordingly, a need exists to detect the risk and sensitivity of smart contacts to recursive call attacks. Thus, the present invention provides a solution for reducing risk of smart contracts in blockchains, again by a processor, is provided. One or more smart contracts may be submitted to a secondary blockchain by one or more of a plurality of nodes prior to accepting the one or more smart contracts to a primary blockchain. The one or more smart contracts may be accepted or rejected from the secondary blockchain to the primary blockchain according to a risk assessment to recursive call attack vulnerabilities.

In one aspect, mechanisms of the illustrated embodiments enable the submission of smart contracts to a blockchain and tags the smart contracts with a risk score according to one or more define metrics. The present invention may differentiate between system complaint smart contracts and client compliant smart contracts, depending on the acceptance or not of a system defined risk thresholds, which may be performed by providing the risk assessment of assets' leaks in turing-complete blockchains and other assessment metrics, in which different peers assess the risk of smart contracts with different sets of risk functions and time parameters.

In one aspect, the risk of recursive call attacks in Turing-complete blockchains may be assessed. A probability of depleting assets with software agents on Turing-complete blockchains may be assessed and measured. A usage of profiling tools, time windows computation and risk assessment may be combined to advise on the probability of assets depletion, on Turing-complete blockchains, via the exploitation of recursive functions.

In an additional aspect, the present invention provides for detecting recursive call attacks such as, for example, recursive call attacks in an asset management environment with one or more application agents. A time window may be determined and a risk of re-entry calls may be assessed using values of the assets stored on a blockchain.

Also, as used herein, a computing system may include large scale computing called "cloud computing" in which resources may interact and/or be accessed via a communications system, such as a computer network. Resources may be software-rendered simulations and/or emulations of computing devices, storage devices, applications, and/or other computer-related devices and/or services run on one or more computing devices, such as a server. For example, a plurality of servers may communicate and/or share information that may expand and/or contract across servers depending on an amount of processing power, storage space, and/or other computing resources needed to accomplish requested tasks. The word "cloud" alludes to the cloud-shaped appearance of a diagram of interconnectivity between computing devices, computer networks, and/or other computer related devices that interact in such an arrangement.

It should be noted that one or more computations or calculations may be performed using various mathematical operations or functions that may involve one or more mathematical operations (e.g., solving differential equations or partial differential equations analytically or computationally, using addition, subtraction, division, multiplication, standard deviations, means, averages, percentages, statistical modeling using statistical distributions, by finding minimums, maximums or similar thresholds for combined variables, etc.).

Other examples of various aspects of the illustrated embodiments, and corresponding benefits, will be described further herein.

It is understood in advance that although this disclosure includes a detailed description on cloud computing, implementation of the teachings recited herein are not limited to a cloud computing environment and/or computing systems associated with one or more vehicles. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
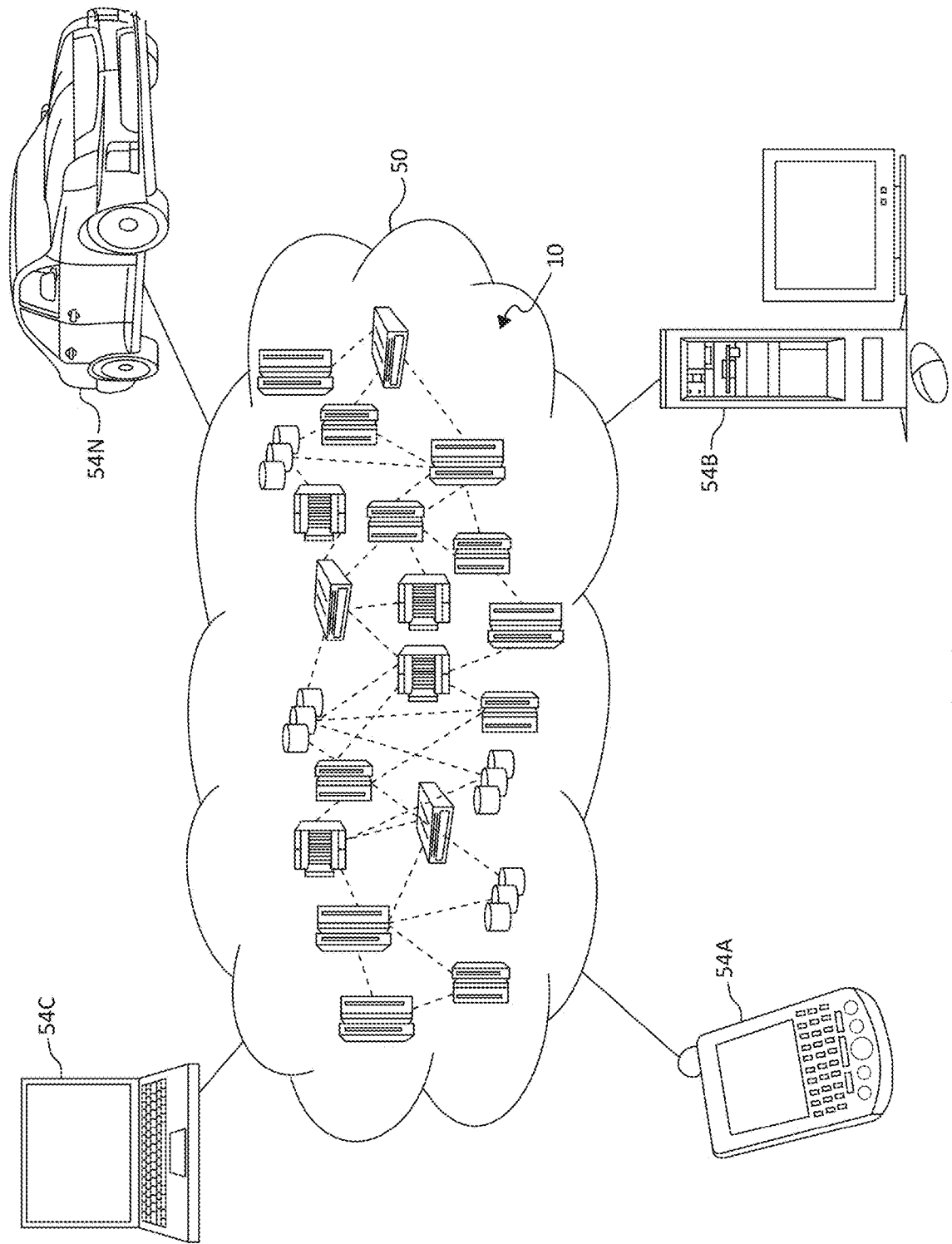
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
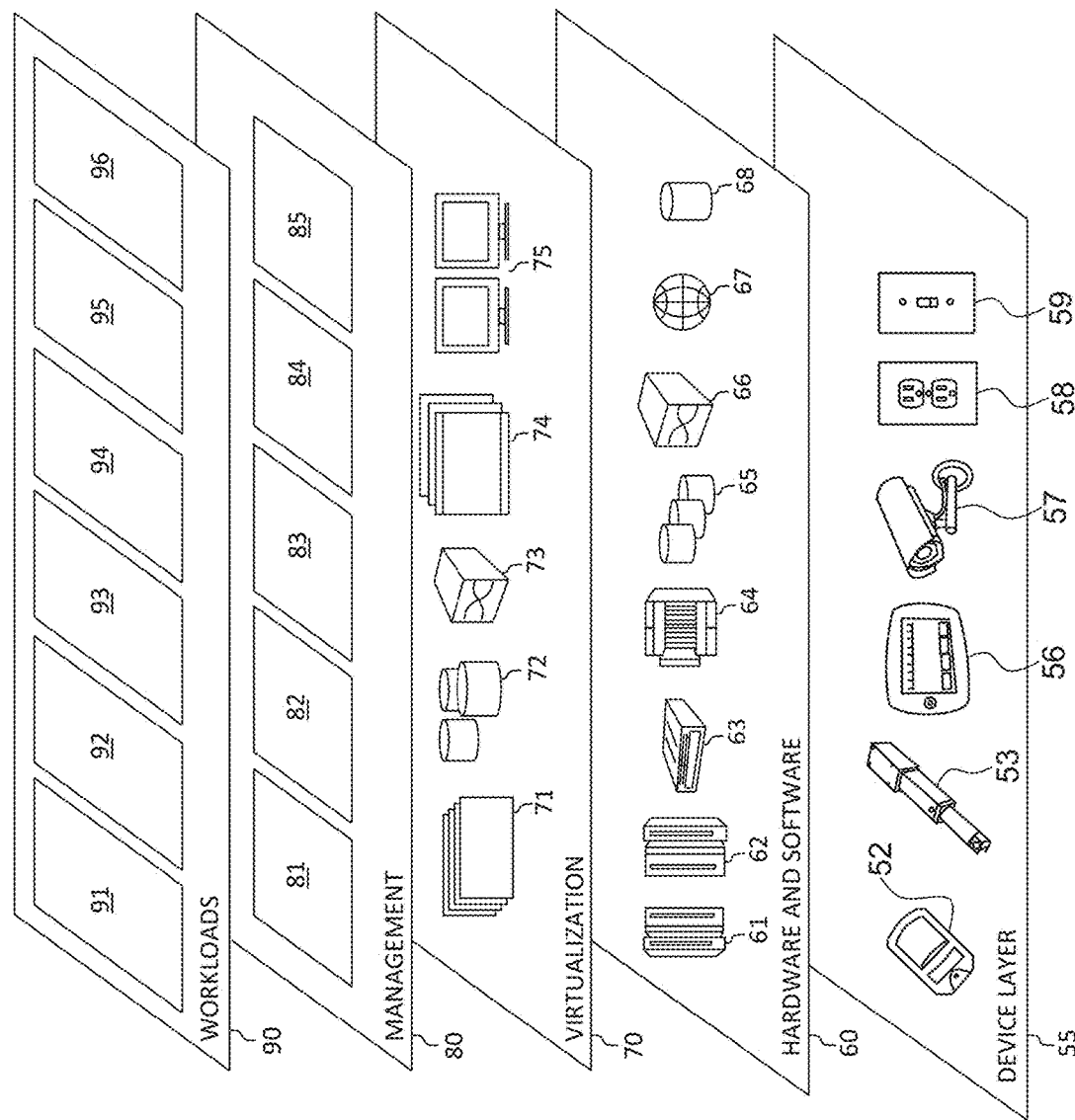
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for reducing risk of smart contracts and/or asset leak risk assessment in a blockchain. In addition, workloads and functions 96 for reducing risk of smart contracts and/or asset leak risk assessment in a blockchain may include such operations as data analytics, data analysis, and as will be further described, notification functionality. One of ordinary skill in the art will appreciate that the workloads and functions 96 for reducing risk of smart contracts and/or asset leak risk assessment in a blockchain may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

Figure 4:
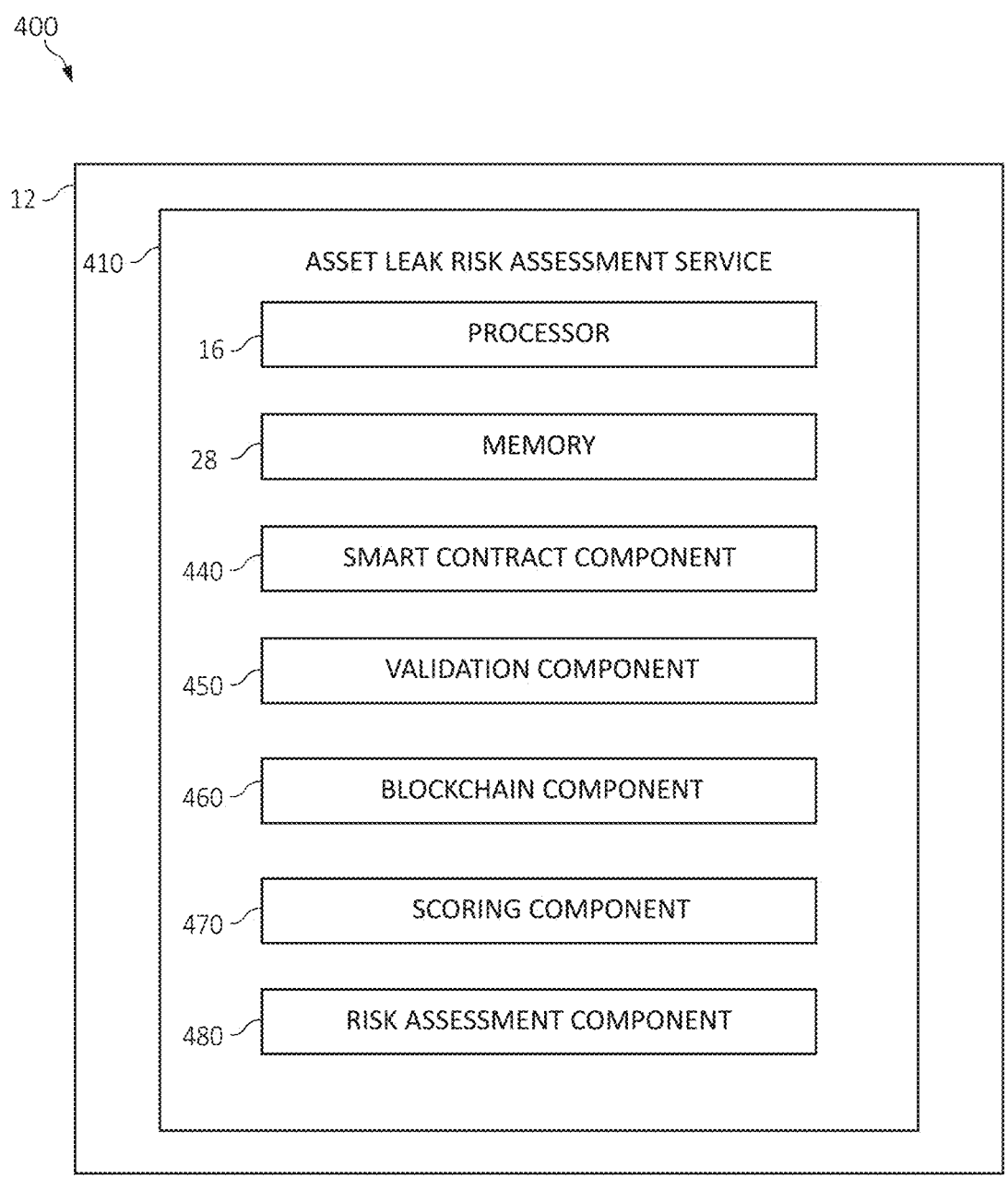
FIG. 4 is an additional block diagram depicting an exemplary functional relationship between various aspects of the present invention.

Turning now to FIG. 4, a block diagram depicting exemplary functional components 400 according to various mechanisms of the illustrated embodiments is shown. FIG. 4 illustrates a system 400 for asset leak risk assessment in Turing-complete blockchains in a computing environment. As will be seen, many of the functional blocks may also be considered "modules" or "components" of functionality, in the same descriptive sense as has been previously described in FIGS. 1-3. With the foregoing in mind, the module/component blocks 400 may also be incorporated into various hardware and software components of a system for cognitive data curation in accordance with the present invention. Many of the functional blocks 400 may execute as background processes on various components, either in distributed computing components, or on the user device, or elsewhere.

Computer system/server 12 of FIG. 1 is shown incorporating a smart contract risk assessment service 410. The smart contract risk assessment service 410 may incorporate processing unit 16 ("processor") and memory 28 of FIG. 1 to perform various computational, data processing and other functionality in accordance with various aspects of the present invention. The smart contract risk assessment service 410 may be provided by the computer system/server 12 of FIG. 1.

As one of ordinary skill in the art will appreciate, the depiction of the various functional units in the smart contract risk assessment service 410 is for purposes of illustration, as the functional units may be located within the smart contract risk assessment service 410 or elsewhere within and/or between distributed computing components.

In one aspect, the computer system/server 12 and/or the smart contract risk assessment service 410 may provide virtualized computing services (i.e., virtualized computing, virtualized storage, virtualized networking, etc.). More specifically, the smart contract risk assessment service 410 may provide, and/or be included in, a virtualized computing, virtualized storage, virtualized networking and other virtualized services that are executing on a hardware substrate.

The smart contract risk assessment service 410 may also function as a database and/or service that may store, maintain, and update data, services, and/or resources internal to and/or external to a cloud computing environment such as described in FIG. 2. In one aspect, smart contract risk assessment service 410 may assist in providing access to and/or assist in performing one or more various types of data, services and/or resources. In one aspect, the smart contract risk assessment service 410 may provide a smart contract component 440, a validation component 450, a blockchain component 460, a scoring component 470, and a risk assessment component 480.

The smart contract component 440, in association with the blockchain component 460, may accept or reject one or more smart contracts from a secondary blockchain to a primary blockchain according to a risk assessment to recursive call attack vulnerabilities.

The smart contract component 440 may receive, and/or enable one or more external users/computing systems, to submit the one or more smart contracts to the secondary blockchain by one or more of a plurality of nodes (which may be associated with a blockchain) prior to accepting the one or more smart contracts to the primary blockchain.

In one aspect, the smart contract component, in association with the validation component 450, may provide an evaluation report of the one or more smart contracts by the one or more evaluation nodes according to the determined risk of the recursive call attack vulnerabilities and use the evaluation report to write the one or more smart contracts to the primary blockchain by one or more of the plurality of nodes.

The smart contract component 440, in association with the validation component 450, may assign one or more attributes to the one or more contracts accepted to the primary blockchain. The smart contract component 440 may monitor the one or more contracts on the primary blockchain using the one or more attributes. In an additional aspect, the smart contract component 440, in association with the blockchain component 460, may provide a signature to the one or more smart contracts.

The smart contract component 440, given a particular computer programming source code ("source code"), may generate/output a list of external calls, an execution queue, and a dependency map for variables and may read input source code that feeds the smart contract risk assessment service 410 with a queue consisting variable modifications and function calls, referred as "Execution Queue," and a variable relation map (e.g., a dependency map). The smart contract component 440 may analyze and profile a time of an external call and generate a list of the variables that the external call invokes.

The smart contract component 440 may generate a list of functions and may profile a time for a selected variable. That is, the smart contract component 440 may profile a time of an external call and generate a list of variables invoked by the external call and may execute a choice of variables based on logic instructions.

The smart contract component 440, in association with the validation component 450 and the risk assessment component 480 may differentiates between system complaint smart contracts and client compliant smart contracts.

The risk assessment component 480 may perform a risk assessment of assets' leaks in Turing-complete blockchains in which different peers assess the risk of smart contracts with different sets of risk functions and time parameters. The risk assessment component 480 may combine the usage of one or more profiling tools, time windows computation and risk assessment to collectively advice on the risk of assets depletion, on Turing-complete blockchains, via the exploitation of recursive functions.

More specifically, the risk assessment component 480 may determine the risk assessment of recursive call attack vulnerabilities according to a recursive call attack threshold or according to risk vulnerability measurements based on a selected call function of asset values, one or more time profiles, and a number of times a variable appears in a suspicious list. The smart contract component 440, in association with the validation component 450 and the risk assessment component 480 may determine a probability of depleting assets from the primary blockchain according to the risk vulnerability measurements and determine a vulnerability risk according to a selected function of asset values, one or more time profiles, a number of times a variable appears in a suspicious list.

The risk assessment component 480, in association with the scoring component 470, may determine the risk assessment to the recursive call attack vulnerabilities of the one or more smart contracts by one or more evaluation nodes from a plurality of nodes associated with the secondary blockchain, the primary blockchain, or a combination thereof. In one aspect, the plurality of nodes, which may be associated with the blockchain component 460, are each permitted to submit smart contracts and the one or more evaluation nodes permitted to determine the risk assessment of the smart contracts.

The risk assessment component 480, in association with the scoring component 470, may assign a risk score to the one or more smart contracts according to a determined risk of the recursive call attack vulnerabilities. The risk assessment component 480, in association with the scoring component 470, may assign a confidence score to the one or more smart contracts indicating a degree of accuracy of the assigned risk score.

The validation component 450 may tag one or more smart contracts in the secondary blockchain according to the determined risk of the recursive call attack vulnerabilities.

The risk assessment component 480 may determine and/or compute a vulnerability risk based on a given function of assets value, time profiles and how many times a variable appears in a suspicious list. That is, the risk assessment component 480 may determine a risk assessment of recursive call attack vulnerabilities according to risk vulnerability measurements generated from a computer program source code, a list of external call functions, a risk assessment function, a list of assets, a parser, or a combination thereof.

The risk assessment component 480 may leverage (optionally) user defined functions that may be used to quantify (according to a context, user preferences, a user experience, etc.) a risk associated with the various characteristics detected. In one aspect, the functions may be linear, exponential, geometric (e.g., risk increasing linearly, exponentially or geometrically depending on the time call is spent on the recursion).

The risk assessment component 480 may determine the risk assessment of recursive call attack vulnerabilities according to a selected call function of asset values, one or more time profiles, and a number of times a variable appears in a suspicious list. In an additional aspect, the risk assessment component 480 may determine a probability of depleting assets from a blockchain according to the risk vulnerability measurements (e.g., depleting assets of a blockchain via a crafted smart contract or a recursive call attack on blockchain exploiting vulnerabilities in the source code). For example, the risk assessment component 480 may analyze the source code of a smart contract and return an associated risk probability.

Figure 5:
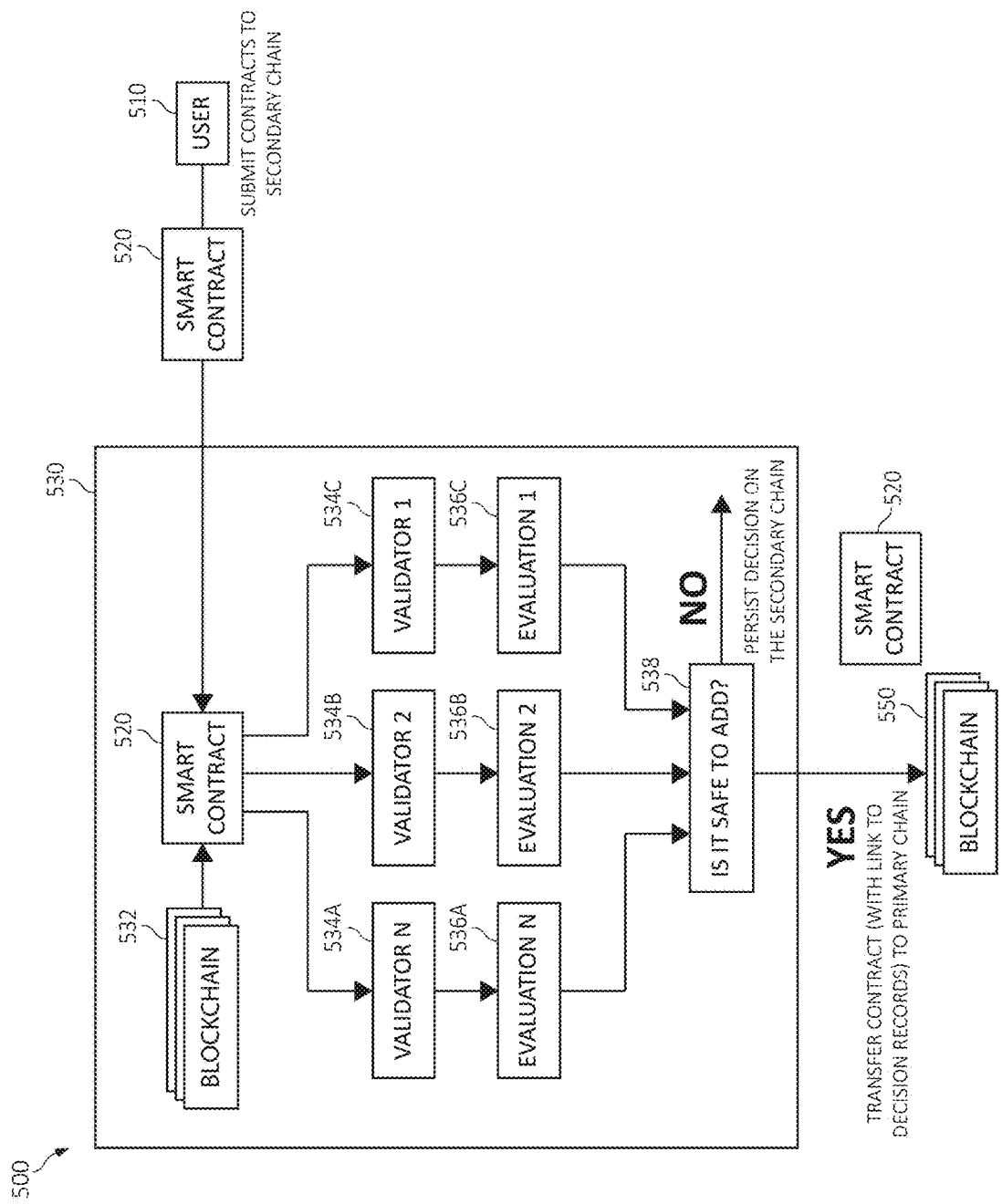
FIG. 5 is block diagram depicting an additional exemplary operations for reducing risk of smart contracts in a blockchain by a processor, again in which aspects of the present invention may be realized.

Turning now to FIG. 5, a block diagram of exemplary functionality 500 relating to reducing risk of smart contracts in a blockchain is depicted, for use in the overall context of smart contracts risk assessment in a blockchain according to various aspects of the present invention. As shown, the various blocks of functionality are depicted with arrows designating the blocks' 500 relationships with each other and to show process flow. Additionally, descriptive information is also seen relating each of the functional blocks 500. As will be seen, many of the functional blocks may also be considered "modules" of functionality, in the same descriptive sense as has been previously described in FIG. 4. With the foregoing in mind, the module blocks 500 may also be if incorporated into various hardware and software components of a system for image enhancement in accordance with the present invention. Many of the functional blocks 500 may execute as background processes on various components, either in distributed computing components, or on the user device, or elsewhere, and performing generalized tasks of reducing risk of smart contracts in a blockchain (e.g., using two hyperledger blockchains such as, for example, a secondary blockchain and a primary blockchain).

One or more users/nodes 510 (e.g., a client and/or a node in the blockchain that is enabled/allowed to create the smart contract) may submit a smart contract 520 to an evaluation blockchain 532 (e.g., a secondary blockchain), which may exist in parallel to the a primary blockchain 550 (e.g., a main blockchain), and a set of constraints that need to be validated (i.e., risk less than a value r, at least k clients accepting the contract etc.). In one aspect, the submitted smart contract 520 may be initially stored in the evaluation blockchain 532.

One or more clients 534A-C that are in association with the users/nodes 510 such as, for example, validator 1, validator 2, and/or validator N) performs or executions one or more similar or different evaluation (or validation) operations 536A-C such as, for example, evaluation 1, evaluation 2, and/or evaluation N on the smart contract 520 and each of the clients 534A-C may submits a new block "$R_i$" that may include 1) a signature of the smart contract 520 (or reference to the block containing it), 2) a risk score (as normalized output of the evaluation tool/mechanism) and, 3) a confidence level (i.e., the risk score being a score/grade indicating a degree of confidence for each of clients 534A-C). In one aspect, the evaluation (or validation) operations 536A-C may be based upon one or more defined policies/procedures such as, for example, a majority vote, a risk score less than a maximum acceptable risk, or other defined policy. More specifically, one or more clients 534A-C may collect a selected number of risk scores and submit an evaluation (e.g., an evaluation report) of the smart contract 520 that indicates whether to accept or refuse the smart contract 520.

In block 538, a determination operation is performed to determine whether the smart contract 520 is safe/secure to add to the primary blockchain 550. That is, based upon the evaluation (or validation) operations 536A-C, the smart contract may be added to the primary blockchain 550 from the secondary blockchain 532. More specifically, one or more authorized client/nodes 510 may be authorized or "dedicated" to write the accepted smart contract 520 to the primary blockchain 550. The dedicated client (or a pool of client/nodes 510) writes on the primary blockchain 550 those smart contracts such as, for example, smart contract 520 that have been accepted by a number of client/nodes 510 satisfying both system defined thresholds (e.g., majority of the clients 534A-C, at least one, more than K number of the clients 534A-C) and one or more user defined requirements initially defined by one or more user/nodes 510. It should be noted that the smart contract 520 submitted to the primary blockchain 550 may be augmented with one or more additional attributes to keep track of the decision process (e.g., the evaluation (or validation) operations 536A-C and the operations of block 538) that lead to the submission of the smart contract 520 and the evaluation requirements requested by the one or more user/nodes 510.

In one aspect, access and control over the primary blockchain 550 may be managed by a hyperledger or other implementation of blockchain support access control and roles. Also, the primary blockchain 550 may operate similar to other blockchains, but the submission of the smart contract 550 is limited to a set of users/nodes that perform evaluation of the results. The secondary blockchain 532 (e.g., a repository blockchain) may be configured as follows. First, all users/nodes have permission to submit smart contracts. A set of validator users/nodes (e.g., clients/nodes 536A-C) have permission to write "risk assessments" evaluation of the smart contracts. A set of evaluator nodes also have permission to write "evaluation reports" of the smart contracts with each of the evaluation reports based on an output of one or more validation nodes. Such evaluation reports may then used by the clients/nodes 536A-C with the permission to write smart contracts to the primary blockchain 550 via a consensus protocol.

Figure 6:
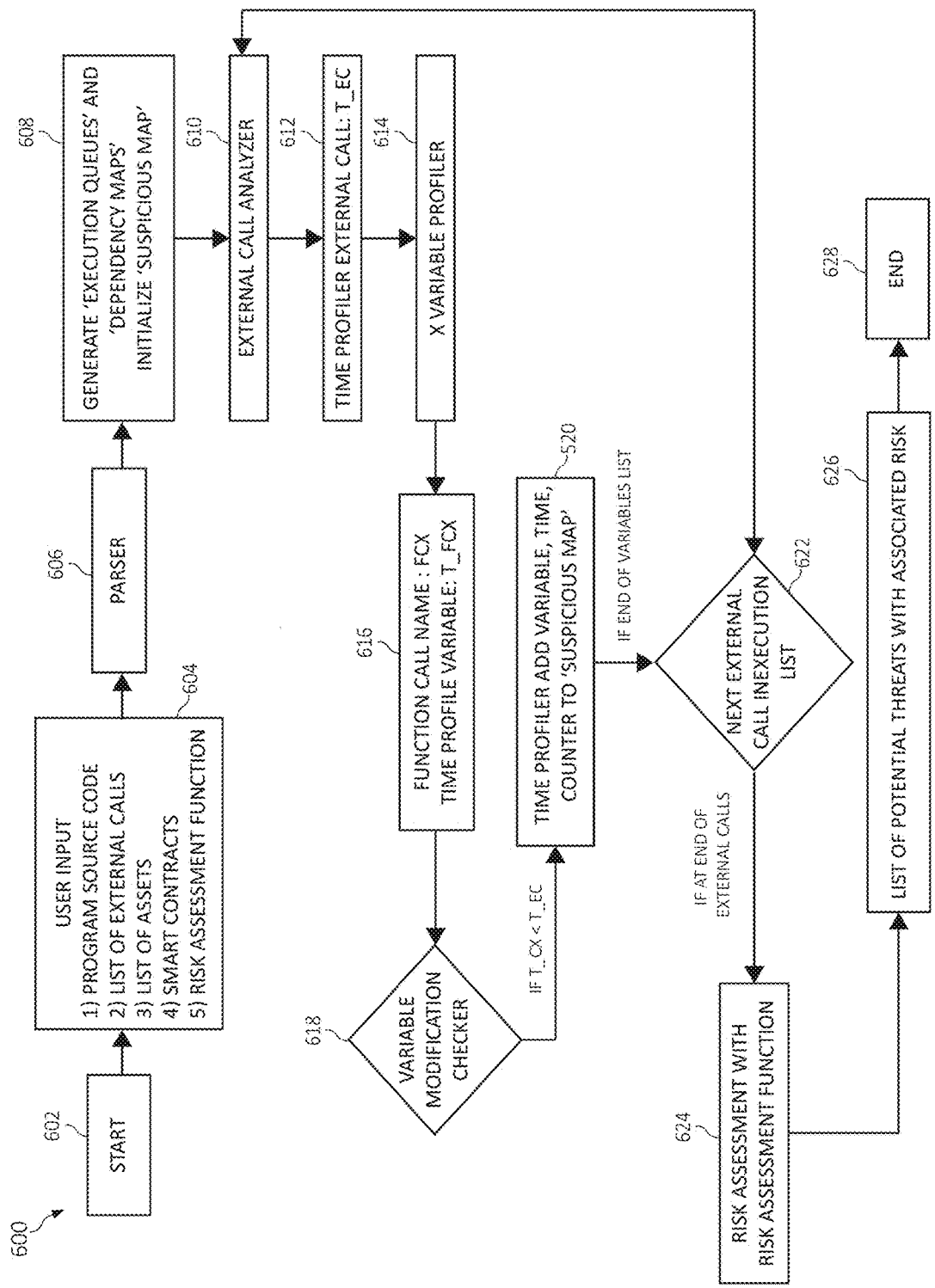
FIG. 6 is block diagram depicting an additional exemplary operations for asset leak risk assessment in Turing-complete blockchains and other metrics in which different peers assess the risk of smart contracts with different sets of risk functions and time parameters by a processor, again in which aspects of the present invention may be realized.

Turning now to FIG. 6, diagram 600 illustrates operations for asset leak risk assessment in Turing-complete blockchains and other metrics in which different peers assess the risk of smart contracts with different sets of risk functions and time parameters by a processor, in which various aspects of the illustrated embodiments may be implemented. The functionality 600 may be implemented as a method executed as instructions on a machine, where the instructions are included on at least one computer readable medium or one non-transitory machine-readable storage medium. Also, one or more components, functionalities, and/or features of FIGS. 1-4 may be implemented in FIG. 6. The functionality 600 may start in block 602.

User input data and smart contracts 604 (e.g., user input) may be collected and/or sent to a parser (e.g., a parser component), as in block 606. The user input data and smart contracts 604 may include, but not limited to, 1) one or more computing program source code, 2) a list of external calls, 3) a list of assets, 4) a risk assessment function, and one or more smart contracts. The parser may generate/output one or more execution queues, and dependency map for variables, and also initialize a suspicious map, as in block 608. From block 608, an external call analyzer (e.g., an external call analyzer component) may receive the output of the parser and analyze and profile a time (e.g., a time profiler operation) of an external call and generate a list of the variables that the external call invokes (e.g., time profiler external call "T_EC"), as in block 612. The time profiler operation is a function that may analyze one or more recursive calls and identify the time windows of each of the recursive calls. That is, time profiler operation may profile and indicate the time windows of each of the recursive calls indicating how long each recursive call remains active (e.g., how long variables remain in a function). The variable profiler (e.g., the variable profiler component 460 of FIG. 4) may receive the data from block 612, as in block 614, and may generate a list of functions (e.g., function call name: "FCX") and profiles a time for a selected variable (e.g., time profile variable: "T_FCX"), as in block 616.

A variable checker (e.g., the variable checker component) may determine if any of the variables have been modified, as in block 618. Thus, not only does the variable checker perform the critical operation to determine those variables in a function and the amount of time (e.g., how long) the variables remain active, but the variable checker component also checks if the variables have been modified. The presence of a modified variable indicates one or more assets and/or smart contracts in the blockchain are being drained. The variable checker may determine whether the time of the modification of the variable is less than the time of the external call (e.g., "T_CX"<"T_EC"), and the time profiler operation may add the variable, the time, and the counter to a suspicious map, as in block 620. That is, "the time of the modification of the variable is less than the time of the external call" (e.g., "T_CX"<"T_EC") means that the time taken by the execution of the source code to update the value of the variable should be less than the time taken by the execution of code to access the variable from outside the executing code. In this example, "T_CX"<"T_EC" means the variable is involved in the source code executed outside the variable normal lifecycle within the blockchain, which may be used as indication of a potential threat.

Upon reaching the end of the variable list, a next or subsequent external call in the execution list may be retrieved (e.g., retrieving further input), as in block 622, and the method 600 moves back to block 610 and/or sends to the external call analyzer a request for the next external call. Upon reaching the end of the external calls, a risk assessment function may be determined or predicted, as in block 624. A list of potential threats (e.g., future threat), and any associated risk, may be generated and/or provided relating to one or more smart contracts, as in block 626. Because the computing system is an offline, the risks of such attacks to one or more smart contracts may be analyzed offline and may ignore the current depletion since the depletion of an asset is a future call (e.g., occurring/happening after the execution of the current smart contract). The functionality 600 may end, as in block 628. It should be noted that FIG. 6 may be performed in an "offline" environment.

Figure 7:
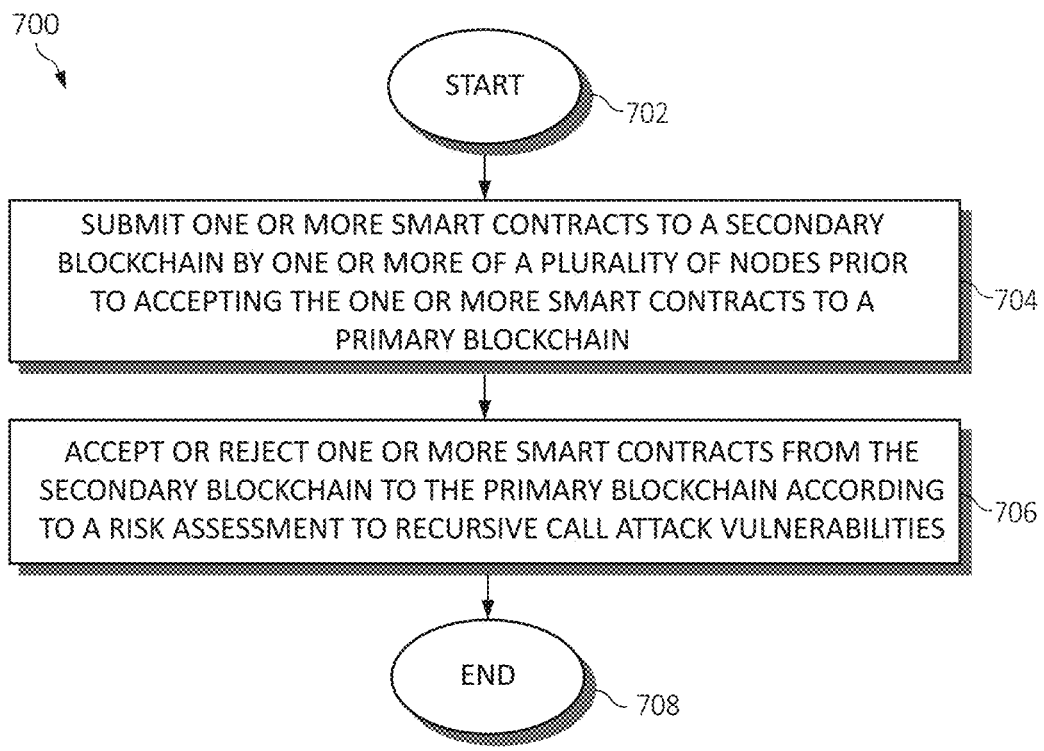
FIG. 7 is an additional flowchart diagram depicting an exemplary method for reducing risk of smart contracts in a blockchain by a processor in which aspects of the present invention may be realized.

Turning now to FIG. 7, a method 700 for reducing risk of smart contracts in blockchains (e.g., Turing-complete blockchains) by a processor is depicted, in which various aspects of the illustrated embodiments may be implemented. The functionality 700 may be implemented as a method executed as instructions on a machine, where the instructions are included on at least one computer readable medium or one non-transitory machine-readable storage medium. The functionality 700 may start in block 702.

One or more smart contracts may be submitted to a secondary blockchain by one or more of a plurality of nodes prior to accepting the one or more smart contracts to a primary blockchain, as in block 704. The one or more smart contracts may be accepted or rejected from the secondary blockchain to the primary blockchain according to a risk assessment to recursive call attack vulnerabilities, as in block 706. The functionality 700 may end, as in block 708.

In one aspect, in conjunction with and/or as part of at least one block of FIG. 7, the operations of method 700 may include each of the following. The operations of method 700 may determine the risk assessment to the recursive call attack vulnerabilities of the one or more smart contracts by one or more evaluation nodes from a plurality of nodes associated with the secondary blockchain, the primary blockchain, or a combination thereof. The plurality of nodes are each permitted to submit smart contracts and the one or more evaluation nodes permitted to determine the risk assessment of the smart contracts.

The operations of method 700 may tag the one or more smart contracts in the secondary blockchain according to the determined risk of the recursive call attack vulnerabilities. The operations of method 700 may provide an evaluation report of the one or more smart contracts by the one or more evaluation nodes according to the determined risk of the recursive call attack vulnerabilities, and/or use the evaluation report to write the one or more smart contracts to the primary blockchain by one or more of the plurality of nodes.

The operations of method 700 may provide a signature to the one or more smart contracts, assign a risk score to the one or more smart contracts according to a determined risk of the recursive call attack vulnerabilities, assign a confidence score to the one or more smart contracts indicating a degree of accuracy of the assigned risk score, assign one or more attributes to the one or more contracts accepted to the primary blockchain, and/or monitor the one or more contracts on the primary blockchain using the one or more attributes.

The operations of method 700 may also determine the risk assessment of recursive call attack vulnerabilities according to a recursive call attack threshold or according to risk vulnerability measurements based on a selected call function of asset values, one or more time profiles, and a number of times a variable appears in a suspicious list, determine a probability of depleting assets from the primary blockchain according to the risk vulnerability measurements, and/or determine a vulnerability risk according to a selected function of asset values, one or more time profiles, a number of times a variable appears in a suspicious list.

Figure 8:
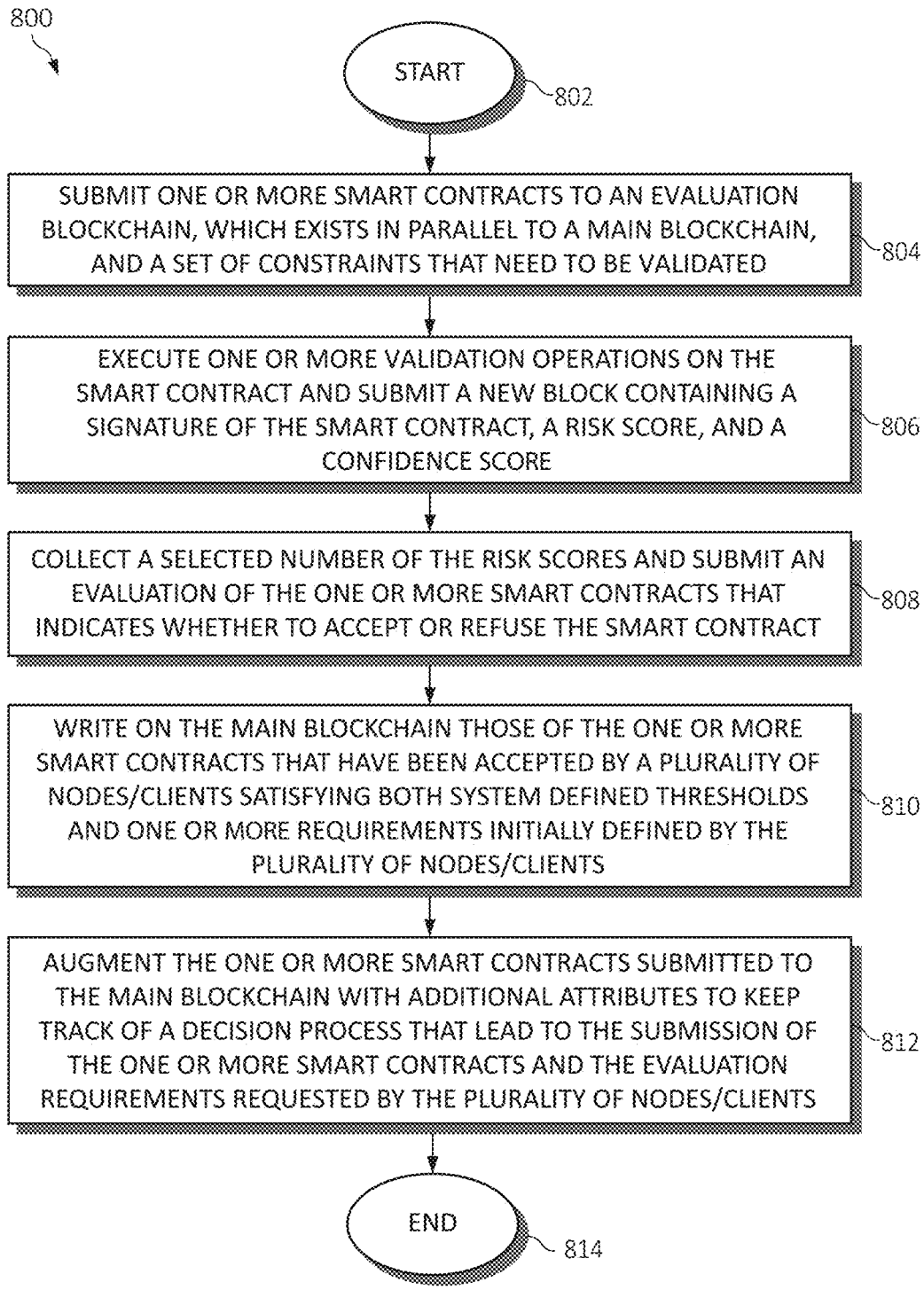
FIG. 8 is an additional flowchart diagram depicting an exemplary method for reducing risk of smart contracts in a blockchain by a processor, again in which aspects of the present invention may be realized.

Turning now to FIG. 8, a method 800 for reducing risk of smart contracts in blockchains (e.g., Turing-complete blockchains) by a processor is depicted, in which various aspects of the illustrated embodiments may be implemented. The functionality 800 may be implemented as a method executed as instructions on a machine, where the instructions are included on at least one computer readable medium or one non-transitory machine-readable storage medium. The functionality 800 may start in block 802.

One or more smart contracts may be submitted to an evaluation blockchain (e.g., a secondary blockchain) which exists in parallel to a main blockchain, and a set of constraints that need to be validated, as in block 804. One or more validation operations may be executed on the smart contract and each client submits a new block containing a signature of the smart contract, a risk score, and a confidence, as in block 806. A selected number of the risk scores may be collected and an evaluation of the one or more smart contracts that indicates whether to accept or refuse the smart contract may be submitted, as in block 808. Those of the one or more smart contracts that have been accepted by a plurality of nodes/clients satisfying both system defined thresholds and one or more requirements initially defined the plurality of nodes/clients may be written on the main blockchain, as in block 810. The one or more smart contracts submitted to the main blockchain may be augmented with additional attributes to keep track of a decision process that lead to the submission of the one or more smart contracts and the evaluation requirements requested by the plurality of nodes/clients, as in block 812. The functionality 800 may end, as in block 814.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for reducing risk of smart contracts in blockchains by a processor, comprising:
    evaluating one or more smart contracts from a secondary blockchain for acceptance or rejection to a primary blockchain according to a risk assessment to recursive call attack vulnerabilities, wherein the risk assessment includes:
        providing a signature to the one or more smart contracts,
        assigning a risk score to the one or more smart contracts according to a determined risk of the recursive call attack vulnerabilities, and
        assigning a confidence score to the one or more smart contracts indicating a degree of accuracy of the assigned risk score;
    assigning one or more attributes to the one or more contracts during the evaluating;
    monitoring progress through the evaluation of the one or more contracts using the one or more attributes; and
    accepting or rejecting the one or more smart contracts from the secondary blockchain to the primary blockchain according to the evaluating.

2. The method of claim 1, further including submitting the one or more smart contracts to the secondary blockchain by one or more of a plurality of nodes prior to accepting the one or more smart contracts to the primary blockchain.

3. The method of claim 1, further including determining the risk assessment to the recursive call attack vulnerabilities of the one or more smart contracts by one or more evaluation nodes from a plurality of nodes associated with the secondary blockchain, the primary blockchain, or a combination thereof, wherein the plurality of nodes are each permitted to submit smart contracts and the one or more evaluation nodes permitted to determine the risk assessment of the smart contracts.

4. The method of claim 3, further including tagging the one or more smart contracts in the secondary blockchain according to the determined risk of the recursive call attack vulnerabilities.

5. The method of claim 3, further including:
    providing an evaluation report of the one or more smart contracts by the one or more evaluation nodes according to the determined risk of the recursive call attack vulnerabilities; and
    using the evaluation report to write the one or more smart contracts to the primary blockchain by one or more of the plurality of nodes.

6. The method of claim 1, further including:
    determining the risk assessment of recursive call attack vulnerabilities according to a recursive call attack threshold or according to risk vulnerability measurements based on a selected call function of asset values, one or more time profiles, and a number of times a variable appears in a suspicious list;
    determining a probability of depleting assets from the primary blockchain according to the risk vulnerability measurements; and
    determining a vulnerability risk according to a selected function of the asset values, the one or more time profiles, and the number of times a variable appears in the suspicious list.

7. A system for reducing risk of smart contracts in blockchains in a computing environment, comprising:
    one or more computers with executable instructions that when executed cause the system to:
        evaluate one or more smart contracts from a secondary blockchain for acceptance or rejection to a primary blockchain according to a risk assessment to recursive call attack vulnerabilities, wherein the risk assessment includes:
            providing a signature to the one or more smart contracts,
            assigning a risk score to the one or more smart contracts according to a determined risk of the recursive call attack vulnerabilities, and
            assigning a confidence score to the one or more smart contracts indicating a degree of accuracy of the assigned risk score;
        assign one or more attributes to the one or more contracts during the evaluating;
        monitor progress through the evaluation of the one or more contracts using the one or more attributes; and
        accept or reject the one or more smart contracts from the secondary blockchain to the primary blockchain according to the evaluating.

8. The system of claim 7, wherein the executable instructions further submit the one or more smart contracts to the secondary blockchain by one or more of a plurality of nodes prior to accepting the one or more smart contracts to the primary blockchain.

9. The system of claim 7, wherein the executable instructions further determine the risk assessment to the recursive call attack vulnerabilities of the one or more smart contracts by one or more evaluation nodes from a plurality of nodes associated with the secondary blockchain, the primary blockchain, or a combination thereof, wherein the plurality of nodes are each permitted to submit smart contracts and the one or more evaluation nodes permitted to determine the risk assessment of the smart contracts.

10. The system of claim 9, wherein the executable instructions further tag the one or more smart contracts in the secondary blockchain according to the determined risk of the recursive call attack vulnerabilities.

11. The system of claim 9, wherein the executable instructions further:
provide an evaluation report of the one or more smart contracts by the one or more evaluation nodes according to the determined risk of the recursive call attack vulnerabilities; and
use the evaluation report to write the one or more smart contracts to the primary blockchain by one or more of the plurality of nodes.

12. The system of claim 7, wherein the executable instructions further:
determine the risk assessment of recursive call attack vulnerabilities according to a recursive call attack threshold or according to risk vulnerability measurements based on a selected call function of asset values, one or more time profiles, and a number of times a variable appears in a suspicious list;
determine a probability of depleting assets from the primary blockchain according to the risk vulnerability measurements; and
determine a vulnerability risk according to a selected function of the asset values, the one or more time profiles, and the number of times a variable appears in the suspicious list.

13. A computer program product for reducing risk of smart contracts in blockchains by a processor, the computer program product comprising a non-transitory computer-readable storage medium having computer-readable program code portions stored therein, the computer-readable program code portions comprising:
an executable portion that evaluates one or more smart contracts from a secondary blockchain for acceptance or rejection to a primary blockchain according to a risk assessment to recursive call attack vulnerabilities,
wherein the risk assessment includes:
providing a signature to the one or more smart contracts,
assigning a risk score to the one or more smart contracts according to a determined risk of the recursive call attack vulnerabilities, and
assigning a confidence score to the one or more smart contracts indicating a degree of accuracy of the assigned risk score;
an executable portion that assigns one or more attributes to the one or more contracts during the evaluating;
an executable portion that monitors progress through the evaluation of the one or more contracts using the one or more attributes; and
an executable portion that accepts or rejects the one or more smart contracts from the secondary blockchain to the primary blockchain according to the evaluating.

14. The computer program product of claim 13, further including an executable portion that determines the risk assessment to the recursive call attack vulnerabilities of the one or more smart contracts by one or more evaluation nodes from a plurality of nodes associated with the secondary blockchain, the primary blockchain, or a combination thereof, wherein the plurality of nodes are each permitted to submit smart contracts and the one or more evaluation nodes permitted to determine the risk assessment of the smart contracts.

15. The computer program product of claim 13, further including an executable portion that tags the one or more smart contracts in the secondary blockchain according to the determined risk of the recursive call attack vulnerabilities.

16. The computer program product of claim 13, further including an executable portion that:
provides an evaluation report of the one or more smart contracts by the one or more evaluation nodes according to the determined risk of the recursive call attack vulnerabilities; and
uses the evaluation report to write the one or more smart contracts to the primary blockchain by one or more of the plurality of nodes.

17. The computer program product of claim 13, further including an executable portion that:
determines the risk assessment of recursive call attack vulnerabilities according to a recursive call attack threshold or according to risk vulnerability measurements based on a selected call function of asset values, one or more time profiles, and a number of times a variable appears in a suspicious list;
determines a probability of depleting assets from the primary blockchain according to the risk vulnerability measurements; and
determines a vulnerability risk according to a selected function of the asset values, the one or more time profiles, and the number of times a variable appears in the suspicious list.

* * * * *